US012658158B2

(12) United States Patent
Ma et al.

(10) Patent No.: US 12,658,158 B2
(45) Date of Patent: Jun. 16, 2026

(54) EYE PROTECTION METHOD, PAPER-LIKE DISPLAY METHOD, DEVICE, AND COMPUTER-READABLE STORAGE MEDIUM

(71) Applicant: Rockchip Electronics Co., Ltd., Fuzhou (CN)

(72) Inventors: Yanzhao Ma, Fuzhou (CN); Jinfa Lin, Fuzhou (CN); Yunshu Chen, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 355 days.

(21) Appl. No.: 18/268,322

(22) PCT Filed: Dec. 22, 2021

(86) PCT No.: PCT/CN2021/140552
§ 371 (c)(1),
(2) Date: Oct. 23, 2023

(87) PCT Pub. No.: WO2022/135488
PCT Pub. Date: Jun. 30, 2022

(65) Prior Publication Data

US 2024/0071333 A1 Feb. 29, 2024

(30) Foreign Application Priority Data

Dec. 22, 2020 (CN) ......................... 202011542817.3
Dec. 22, 2020 (CN) ......................... 202011542856.3

(51) Int. Cl.
*G09G 5/00* (2006.01)

(52) U.S. Cl.
CPC ..... *G09G 5/003* (2013.01); *G09G 2320/0626* (2013.01); *G09G 2320/0666* (2013.01);
(Continued)

(58) Field of Classification Search
CPC ..... G09G 2320/0626; G09G 2320/066; G09G 2320/0693; G09G 2360/144; G09G 5/003
See application file for complete search history.

(56) References Cited

U.S. PATENT DOCUMENTS

2010/0149145 A1* 6/2010 Van Woudenberg .... G09G 3/34 345/207
2012/0320014 A1* 12/2012 Longhurst ................ G09G 5/02 345/207
(Continued)

FOREIGN PATENT DOCUMENTS

CN 101035224 A 9/2007
CN 101151651 3/2008
(Continued)

*Primary Examiner* — Antonio A Caschera
(74) *Attorney, Agent, or Firm* — IPRTOP LLC

(57) ABSTRACT

An eye-protection method, paper-like display method, device, and computer readable storage medium. The eye-protection method includes: acquiring and normalizing composite sensing data in an environment and image data in a multimedia content; and performing a fusion calculation on normalized image data in the multimedia content by normalized composite sensing data in the environment to obtain an image eye-protection guiding parameter, wherein the image eye-protection guiding parameter has a mapping relationship with the normalized composite sensing data in the environment and the normalized image data in the multimedia content; and adjusting the image data in the multimedia content based on the image eye-protection guiding parameter to allow the multimedia content to form a multimedia image having an eye-protection effect. This invention leverages the power of fusion computing and deep learning to develop an algorithm that enhances the eye-protection features of electronic devices.

8 Claims, 6 Drawing Sheets

(52) U.S. Cl.
CPC ............... *G09G 2320/0693* (2013.01); *G09G 2360/144* (2013.01)

(56) References Cited

U.S. PATENT DOCUMENTS

| | | | | |
|---|---|---|---|---|
| 2015/0084997 | A1 | 3/2015 | Kim et al. | |
| 2020/0305708 | A1* | 10/2020 | Krueger | G06F 3/013 |
| 2023/0119935 | A1* | 4/2023 | Sztuk | G02B 27/0172 345/8 |

FOREIGN PATENT DOCUMENTS

| | | | |
|---|---|---|---|
| CN | 101151651 | Y | 3/2008 |
| CN | 112037731 | Y | 12/2020 |

* cited by examiner

EYE PROTECTION METHOD, PAPER-LIKE DISPLAY METHOD, DEVICE, AND COMPUTER-READABLE STORAGE MEDIUM

FIELD OF THE INVENTION

The present disclosure generally relates to image processing, and particularly to an eye-protection method, paper-like display method, device, and computer readable storage medium.

BACKGROUND OF THE INVENTION

Electronic products have become deeply integrated into all aspects of our daily lives. They play a significant role in activities such as work, leisure, shopping, entertainment, and education. As we increasingly rely on electronic products, the average time spent using them continues to rise. Consequently, the incidence of myopia is also on the rise.

Physical factors such as electromagnetic radiation, strong light, refresh rate and screen material of electronic products can cause discomfort if we use these products for long periods of time.

Therefore, how to provide an eye-protection method, paper-like display method, device, and computer-readable storage medium to overcome the shortcomings of existing electronic products has become an urgent technical problem to be solved.

SUMMARY OF THE INVENTION

In view of the above-described shortcomings of the related art, the present disclosure provides an eye-protection method, paper-like display method, device and computer-readable storage medium for solving the problem of eye discomfort caused by existing electronic products.

To achieve these and other related purposes, a first aspect of the present disclosure provides an eye-protection system, including a composite sensing data collector for collecting composite sensing data in an environment; a display for displaying image data in a multimedia content; and a processor for acquiring and normalizing the composite sensing data in the environment and the image data in the multimedia content, performing a fusion calculation on normalized image data in the multimedia content by normalized composite sensing data in the environment to obtain an image eye-protection guiding parameter, and adjusting the image data in the multimedia content based on the image eye-protection guiding parameter to allow the multimedia content to form a multimedia image having an eye-protection effect, wherein the image eye-protection guiding parameter has a mapping relationship with the normalized composite sensing data in the environment and the normalized image data in the multimedia content.

In one embodiment of the first aspect of the present disclosure, the composite sensing data collector includes an RGB sensor, a depth sensor, a light sensor, a distance sensor, and/or an infrared sensor, etc.

In one embodiment of the first aspect of the present disclosure, after the multimedia image having the eye-protection effect is formed, the processor tunes the display based on the composite sensing data in the environment collected by the composite sensing data collector so that the display displays the multimedia content having the eye-protection effect.

In an embodiment of the first aspect of the present disclosure, the processor normalizes the composite sensing data in the environment through filtering out outliers, interpolating and repairing missing values, mapping parameter value fields, and/or adjusting parameter weights; the processor normalizes the image data in the multimedia content through performing color format conversion, image rotation, image scaling, and/or image cropping on the image data in the multimedia content.

In an embodiment of the first aspect of the present disclosure, the processor has a learning engine for image data provided therein; the processor, when performing the fusion calculation on the normalized image data in the multimedia content by the normalized composite sensing data in the environment, invokes the learning engine for image data to load an eye-protection model file, and establishes a mapping relationship between the eye-protection model file on one side and the normalized composite sensing data in the environment and the normalized image data in the multimedia content on the other side according to the eye-protection model file, in order to infer the image eye-protection guiding parameter, wherein the eye-protection model file is a data file obtained by training a convolutional neural network with a generic eye-protection dataset.

A second aspect of the present disclosure provides an eye-protection method including: acquiring and normalizing composite sensing data in an environment and image data in a multimedia content; and performing a fusion calculation on normalized image data in the multimedia content by normalized composite sensing data in the environment to obtain an image eye-protection guiding parameter, wherein the image eye-protection guiding parameter has a mapping relationship with the normalized composite sensing data in the environment and the normalized image data in the multimedia content; and adjusting the image data in the multimedia content based on the image eye-protection guiding parameter to allow the multimedia content to form a multimedia image having an eye-protection effect.

In an embodiment of the second aspect of the present disclosure, normalizing the composite sensing data in the environment includes: filtering out outliers, interpolating and repairing missing values, mapping parameter value fields, and/or adjusting parameter weights for the composite sensing data in the environment; normalizing the image data in the multimedia content includes: performing color format conversion, image rotation, image scaling, and/or image cropping on the image data in the multimedia content.

In an embodiment of the second aspect of the present disclosure, the operation of performing the fusion calculation on the normalized image data in the multimedia content by normalized composite sensing data in the environment to obtain an image eye-protecting guiding parameter includes: invoking a learning engine, where the image data in the multimedia content are pre-stored, to load an eye-protection model file, and establishing a mapping relationship between the eye-protection model file on one side and the normalized composite sensing data in the environment and the normalized image data in the multimedia content on the other side according to the eye-protection model file, in order to infer the image eye-protection guiding parameter, wherein the eye-protection model file is a data file obtained by training a convolutional neural network with a generic eye-protection dataset.

A third aspect of the present disclosure provides a non-transitory computer-readable storage medium on which a computer program is stored, wherein when executed by a processor, the computer program implements the above eye-protection method.

A fourth aspect of the present disclosure provides a device including: a processor and a memory; the memory is used to store a computer program, and the processor is used to execute the computer program stored in the memory to cause the device to perform the data eye-protection method.

A fifth aspect of the present disclosure provides a paper-like display method; the paper-like display method includes: obtaining a light parameter of a current environment; obtaining an image to be displayed; obtaining a reference image having a paper-like display effect in a standard environment; processing the light parameter of the current environment, the image to be displayed, and the reference image by using a deep learning model, to obtain an image with a paper-like display effect; adjusting a display parameter of a display screen according to the light parameter of the current environment so that the display screen has an eye-protection effect; and displaying the image with the paper-like display effect using the display screen.

In an embodiment of a fifth aspect of the present disclosure, the paper-like display method further includes: normalizing the light parameter of the current environment, the image to be displayed, and/or the reference image.

In an embodiment of the fifth aspect of the present disclosure, normalizing the light parameter of the current environment includes filtering out outliers, interpolating and repairing missing values, mapping parameter value fields and/or adjusting parameter weights; and/or normalizing the image to be displayed and/or the reference image includes performing color format conversion, image rotation, image scaling, and/or image cropping.

In an embodiment of a fifth aspect of the present disclosure, a training for the deep learning model includes: acquiring training data, which includes an image of a paper material acquired by an image acquisition device in the standard environment, and a mapping relationship between color pixel values displayed on the display screen and color pixel values acquired by the image acquisition device; and training the deep learning model using the training data.

In an embodiment of the fifth aspect of the present disclosure, acquiring the mapping relationship includes: using the display screen to sequentially display a plurality of first color pixel values; acquiring second color pixel values, which are obtained by the image acquisition device and each correspond to one of the first color pixel values, respectively; and obtaining the mapping relationship based on the first color pixel values and the second color pixel values.

In an embodiment of the fifth aspect of the present disclosure, after acquiring the training data, the training for the deep learning model further includes: normalizing the training data, and/or calibrating feature points on images in the training data.

In an embodiment of a fifth aspect of the present disclosure, the deep learning model includes a paper-like image sub-model and a screen displaying sub-model, wherein the paper-like image sub-model maps the image to be displayed to an image with a first paper-like effect, and the screen displaying sub-model maps the image with the first paper-like effect to the image with the paper-like display effect, wherein the first paper-like effect refers to a paper-like effect as observed by the human eye.

In an embodiment of the fifth aspect of the present disclosure, the light parameter of the current environment includes brightness and/or color temperature of the current environment; the display parameter of the display screen includes display brightness and/or display color temperature; and adjusting a display parameter of a display screen according to the light parameter of the current environment includes: calibrating a white balance parameter of the display screen and the display brightness; obtaining a color temperature curve and a brightness curve according to calibrated white balance parameter and calibrated display brightness; and adjusting the display parameter of the display screen according to the light parameter of the current environment, the color temperature curve, and the brightness curve.

A sixth aspect of the present disclosure provides a computer readable storage medium having a computer program stored thereon, which program when executed by a processor implements the paper-like display method described in any one of the first aspects of the present disclosure.

A seventh aspect of the present disclosure provides a paper-like display device, and the paper-like display device includes: a memory, having a computer program stored thereon; a processor, communicatively coupled to the memory, and for executing the computer program to implement a paper-like display method according to any one of claims 1 to 8; a display, communicatively coupled to the memory and the processor, and for displaying an interactive graphics user interface associated with the paper-like display method; and a sensor, communicatively coupled to the processor, and for obtaining a light parameter of a current environment.

As described above, the eye-protection method, the paper-like display method, the device, and the computer readable storage medium described in the present disclosure have the following beneficial effects:

First, by taking full advantage of the computing power and sensor data of electronic devices, and using a combination of fusion computing and deep learning, the eye-protection method described in the present disclosure has developed an eye-protection algorithm to enhance the eye-protection features of electronic devices.

Second, the paper-like display method described in the present disclosure can process a light parameter of a current environment, an image to be displayed, and a reference image using a deep learning model to obtain an image with a paper-like display effect; furthermore, the paper-like display method can adjust a display parameter of the display screen according to the light parameter of the current environment so that the display screen has an eye-protection effect. By adjusting the image to be displayed to an image with a paper-like display effect and adjusting the display to have an eye-protection effect, the present disclosure can achieve a good eye-protection effect.

REFERENCE NUMERALS

Figure 1:
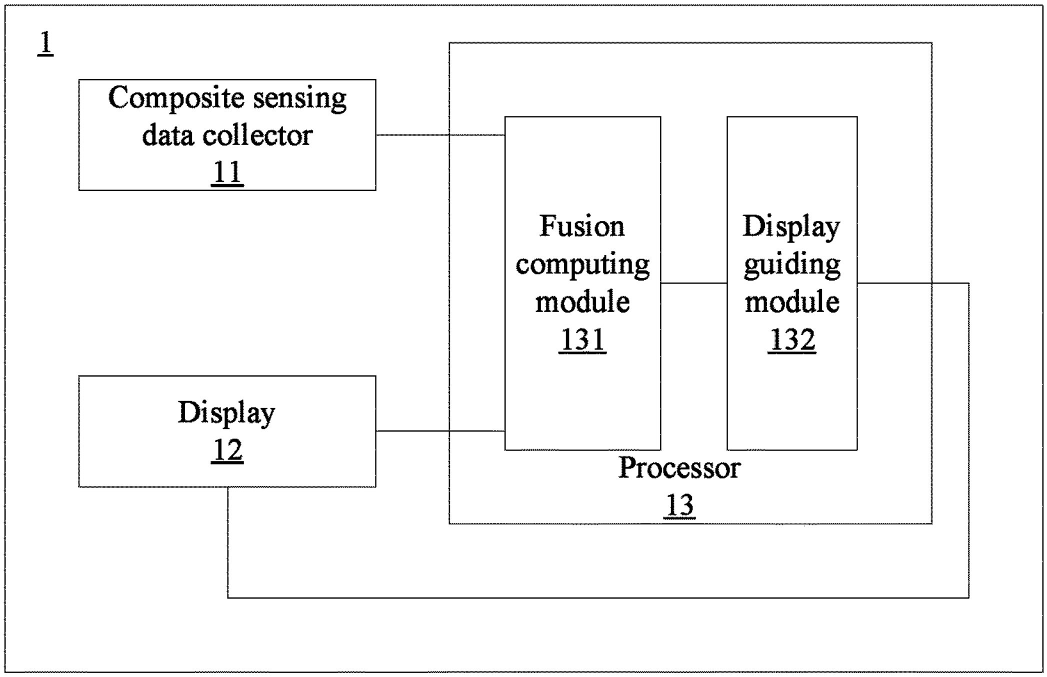
FIG. 1 shows a block diagram of an eye-protection system according to an embodiment of the present disclosure.

1 Eye-protecting system
11 Composite sensing data collector
12 Display
13 Processor
131 Fusion computing module
132 Display guiding module
3 Device
31 Processor
32 Memory
33 Transceiver
34 Communication interface
35 System bus
S21 to S24 Operations
500 Paper-like display device
510 Memory
520 Processor
530 Display
540 Sensor
S11 to S16 Operations
S21 to S22 Operations
S211 to S213 Operations
S31 to S33 Operations
S41 to S46 Operations
S431 to S435 Operations

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity and proportion of each component can be changed as needed, and the components' layout may also be more complicated.

First Embodiment

First Embodiment provides an eye-protection system, including:

a composite sensing data collector for collecting composite sensing data in an environment;

a display for displaying image data in a multimedia content;

a processor for acquiring and normalizing the composite sensing data in the environment and the image data in the multimedia content, performing a fusion calculation on normalized image data in the multimedia content by normalized composite sensing data in the environment to obtain an image eye-protection guiding parameter, and adjusting the image data in the multimedia content based on the image eye-protection guiding parameter to allow the multimedia content to form a multimedia image having an eye-protection effect, wherein the image eye-protection guiding parameter has a mapping relationship with the normalized composite sensing data in the environment and the normalized image data in the multimedia content.

The eye-protection system provided in First Embodiment will be described in detail below with reference to the drawings. The eye-protection system can be used in electronic devices with displays, such as smartphones, tablets, and laptops. Referring to FIG. 1, which shows a block diagram of an eye-protection system according to an embodiment of the present disclosure. As shown in FIG. 1, the eye-protection system 1 includes a composite sensing data collector 11, a display 12, and a processor 13.

The composite sensing data collector 11 is used to collect composite sensing data in the environment in which the corresponding electronic product is located. The composite sensing data in the environment includes color temperature and brightness of the environment, etc.

In one embodiment, the composite sensing data collector 11 includes an RGB sensor, a depth sensor, a light sensor, a distance sensor, and/or an infrared sensor, etc.

The display 12 is used to display image data in the multimedia content. The multimedia content includes one or more of textbooks, picture books, videos, images, and interfaces, etc., all in an image format.

The processor 13 is connected to the compound sensing data collector 11 and the display 12; the processor 13 is used for acquiring and normalizing the composite sensing data in the environment and image data in the multimedia content, performing the fusion calculation on normalized image data in the multimedia content by normalized composite sensing data in the environment to obtain an image eye-protecting guiding parameter, and adjusting the image data in the multimedia content based on the image eye-protection guiding parameter to allow the multimedia content to form a multimedia image having an eye-protection effect. The image eye-protection guiding parameter has a mapping relationship with the normalized composite sensing data in the environment and the normalized image data in the multimedia content. As shown in FIG. 1, the processor 13 includes a fusion computing module 131 and a display guiding module 132.

Since the composite sensing data collector 11 acquires data that may fluctuate, outliers of the data need to be dealt with. In addition, for each batch of newly collected composite sensing data in the environment and image data in the multimedia content their parameters need to be normalized to ensure a fixed parameter distribution as well as to speed up the efficiency of subsequent data optimization. In addition, the composite sensing data in the environment and image data in the multimedia content are different variables, they may have different data ranges and different data formats, and therefore the processor 13 needs to normalize the two separately.

Specifically, the fusion computing module 131 normalizes the composite sensing data in the environment through filtering out the outliers, interpolating and repairing missing values, mapping parameter value fields, and/or adjusting parameter weights.

Specifically, the fusion computing module 131 normalizes the image data in the multimedia content through performing color format conversion, image rotation, image scaling, and/or image cropping on the image data in the multimedia content.

In one embodiment, the fusion computing module 131 uses a machine learning method for image data, a deep learning method for image data, an expert system method for image data, and other related methods to perform fusion computing on the normalized composite sensing data in the environment and the normalized image data in the multimedia content to generate the image eye-protection guiding parameter.

Under different color temperatures and different brightness levels, for images with different content, the subjective perception of parameters such as brightness, white balance, saturation, and contrast is obtained through psychological experiments. Through learning methods (e.g., machine learning techniques), a mapping relationship is established between information such as color temperature, illumination, and image content, and appropriate white balance, brightness, saturation, and contrast as subjectively perceived by the human eye, to obtain the image eye-protection guiding parameter.

Specifically, the fusion computing module 131, when performing the fusion calculation on the normalized image data in the multimedia content by the normalized composite sensing data in the environment, invokes the learning engine for image data to load an eye-protection model file, and establishes a mapping relationship between the eye-protection model file on one side and the normalized composite sensing data in the environment and the normalized image data in the multimedia content on the other side according to the eye-protection model file, in order to infer the image eye-protection guiding parameter, wherein the eye-protection model file is a data file obtained by training a convolutional neural network with a generic eye-protection dataset. In one embodiment, the image eye-protection guiding parameter can provide prior knowledge for image processing, so that the processing results can simulate the effect of diffuse reflection similar to paper under real ambient light.

In one embodiment, a training process of the generic eye-protection dataset includes data calibration, model definition, parameter tuning, data training, and finally a weighted network for the above specific data is obtained.

In one embodiment, the image eye-protection guiding parameter includes: color temperature and brightness of the display under different ambient light, distance from the human eye to the display, and other parameters (e.g., color, brightness, contrast) required for different display contents.

In one embodiment, after obtaining the image eye-protection guiding parameter, the display guiding module 132 is further used to adjust the image data in the multimedia content based on the image eye-protection guiding parameter to allow the multimedia content to form a multimedia image having an eye-protection effect.

Specifically, the display guiding module 132, according to the image eye-protection guiding parameter, adjusts the brightness of the multimedia content to be consistent with the brightness of the ambient light as indicated by the image eye-protection guiding parameter, adjusts the color temperature of the multimedia content to be consistent with the color temperature of the ambient light as indicated by the image eye-protection guiding parameter, adjusts the contrast of the multimedia content to be consistent with the contrast as indicated by the image eye-protection guiding parameter, and calculates, according to the image eye-protection guiding parameter, different color mapping relationships for different colors in particular environments, based on which the colors of the multimedia content are adjusted.

In one embodiment, the above adjustment of the image data in the multimedia content can be achieved by artificial intelligence techniques such as machine learning, deep learning, and unsupervised learning, and/or image processing techniques such as global tone mapping, and local tone mapping.

In practical applications, it may be insufficient to adjust only the eye-protection effect of the digital images to be displayed, and parameters such as display brightness and display color temperature of the display may also need to be adjusted in order to achieve the best eye-protection effect.

After the multimedia image having the eye-protection effect is formed, the processor 13 tunes the display based on the composite sensing data in the environment collected by the composite sensing data collector so that the display displays the multimedia content having the eye-protection effect.

The processor may be a general-purpose processor, for example, a central processing unit (CPU for short), a network processor (NP), etc.; it may also be a Digital Signal Processor (DSP), Application Specific Integrated Circuit (ASIC), Field-Programmable Gate Array (FPGA), other programming logic devices, discrete gates or transistor logic devices, or discrete hardware components.

In one embodiment, these modules can all be implemented in the form of software called by processing components. In one embodiment, they can also be all implemented in the form of hardware. In one embodiment, some of the modules can also be realized in the form of software called by processing components, and some of the module can be realized in the form of hardware. For example, an x module may be a separate processing component, or may be integrated in a chip of the above-mentioned system. In addition, the x module may also be stored in the memory of the above system in the form of program code. The function of the above x module is called and executed by a processing component of the above system. The implementation of other modules is similar. All or part of these modules may be integrated or implemented independently. The processing elements described herein may be an integrated circuit with signal processing capabilities. In the implementation process, each operation of the above method or each of the above modules may be completed by an integrated logic circuit of hardware in the processor element or an instruction in a form of software. The above modules may be one or more integrated circuits configured to implement the above method, such as one or more Application Specific Integrated Circuits (ASICs), one or more Digital Signal Processors (DSPs), or one or more Field Programmable Gate Arrays (FPGAs). When one of the above modules is implemented in the form of calling program codes by a processing component, the processing component may be a general processor, such as a Central Processing Unit (CPU) or other processors that may call program codes. These modules may be integrated and implemented in the form of a system-on-a-chip (SOC).

By taking full advantage of the computing power and sensor data of electronic devices, and using a combination of fusion computing and deep learning, the eye-protection system described in the present disclosure has developed an eye-protection algorithm to enhance the eye-protection features of electronic devices.

Second Embodiment

Second Embodiment provides an eye-protection method, including:

- acquiring and normalizing composite sensing data in an environment and image data in a multimedia content; and
- performing a fusion calculation on normalized image data in the multimedia content by normalized composite sensing data in the environment to obtain an image eye-protection guiding parameter, wherein the image eye-protection guiding parameter has a mapping relationship with the normalized composite sensing data in the environment and the normalized image data in the multimedia content; and
- adjusting the image data in the multimedia content based on the image eye-protection guiding parameter to allow the multimedia content to form a multimedia image having an eye-protection effect.

Figure 2:
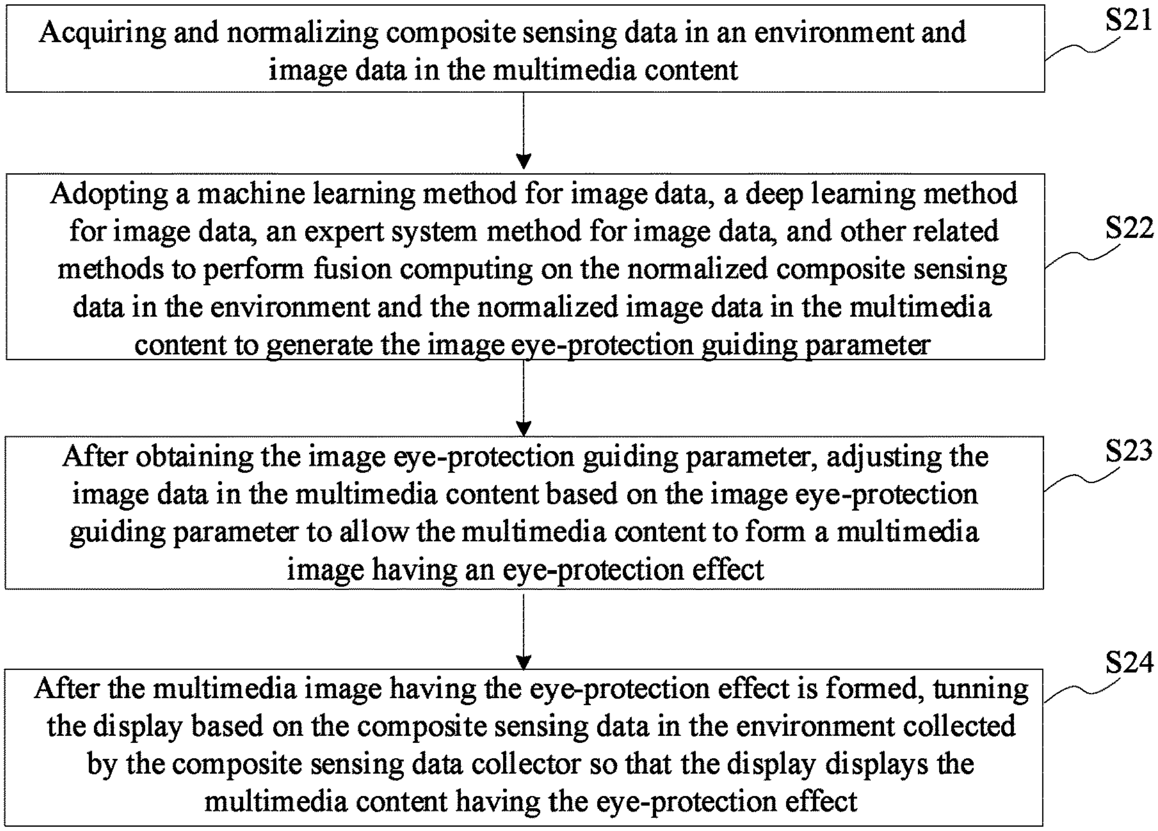
FIG. 2 is a flowchart illustrating an eye-protection method according to an embodiment of the present disclosure.

The eye-protection method will be described in detail below with reference to the drawings. Referring to FIG. 2, which is a flowchart of an eye-protection method according to an embodiment of the present disclosure. As shown in FIG. 2, the eye-protection method includes operations S21 to S24.

S21: acquiring and normalizing composite sensing data in an environment and image data in the multimedia content.

Since the acquired data may fluctuate too much, outliers of the data need to be dealt with. In addition, for each batch of newly collected composite sensing data in the environment and image data in the multimedia content their parameters need to be normalized to ensure a fixed parameter distribution as well as to speed up the efficiency of subsequent data optimization. In addition, the composite sensing data in the environment and image data in the multimedia content are different variables, they may have different data ranges and different data formats, and therefore the two needs to be normalized separately.

Specifically, the operation of normalizing the composite sensing data in the environment includes filtering out the outliers, interpolating and repairing missing values, mapping parameter value fields, and adjusting parameter weights.

Specifically, the operation of normalizing the image data in the multimedia content includes performing color format conversion, image rotation, image scaling, and/or image cropping on the image data in the multimedia content.

S22: adopting a machine learning method for image data, a deep learning method for image data, an expert system method for image data, and other related methods to perform fusion computing on the normalized composite sensing data in the environment and the normalized image data in the multimedia content to generate the image eye-protection guiding parameter.

Under different color temperatures and different brightness levels, for images with different content, the subjective perception of parameters such as brightness, white balance, saturation, and contrast is obtained through psychological experiments. Through learning methods (e.g., machine learning techniques), a mapping relationship is established between information such as color temperature, illumination, and image content, and appropriate white balance, brightness, saturation, and contrast as subjectively perceived by the human eye, to obtain the image eye-protection guiding parameter.

The operation of performing the fusion calculation on the normalized image data in the multimedia content by the normalized composite sensing data in the environment to obtain the image eye-protecting guiding parameter includes: when performing the fusion calculation on the normalized image data in the multimedia content by the normalized composite sensing data in the environment, invoking the image data learning engine to load an eye-protecting model file, and establishing a mapping relationship between the eye-protecting model file on one side and the normalized composite sensing data in the environment and the normalized image data in the multimedia content on the other side according to the eye-protecting model file, in order to infer the image eye-protecting guiding parameter, wherein the eye-protection model file is a data file obtained by training a convolutional neural network with a generic eye-protection dataset. In one embodiment, the image eye-protection guiding parameter can provide prior knowledge for image processing, so that the processing results can simulate the effect of diffuse reflection similar to paper under real ambient light.

In one embodiment, a training process of the generic eye-protection dataset includes data calibration, model definition, parameter tuning, data training, and finally a weighted network for the above specific data is obtained.

In one embodiment, the image eye-protection guiding parameter includes: color temperature and brightness of the display under different ambient light, distance from the human eye to the display, and other parameters (e.g., color, brightness, contrast) required for different display contents.

S23: after obtaining the image eye-protection guiding parameter, adjusting the image data in the multimedia content based on the image eye-protection guiding parameter to allow the multimedia content to form a multimedia image having an eye-protection effect.

More specifically, S23 includes: according to the image eye-protection guiding parameter, adjusting the brightness of the multimedia content to be consistent with the brightness of the ambient light as indicated by the image eye-protection guiding parameter, adjusting the color temperature of the multimedia content to be consistent with the color temperature of the ambient light as indicated by the image eye-protection guiding parameter, adjusting the contrast of the multimedia content to be consistent with the contrast as indicated by the image eye-protection guiding parameter, and calculating, according to the image eye-protection guiding parameter, different color mapping relationships for different colors in particular environments, based on which the colors of the multimedia content are adjusted.

In one embodiment, the above adjustment of the image data in the multimedia content can be achieved by artificial intelligence techniques such as machine learning, deep learning, and unsupervised learning, and/or image processing techniques such as global tone mapping, and local tone mapping.

In practical applications, it may be insufficient to adjust only the eye-protection effect of the digital images to be displayed, and parameters such as brightness and color temperature of the display may also need to be adjusted in order to achieve the best eye-protection effect.

S24: after the multimedia image having the eye-protection effect is formed, tunning the display based on the composite sensing data in the environment collected by the composite sensing data collector so that the display displays the multimedia content having the eye-protection effect.

The present disclosure also provides a non-transitory computer-readable storage medium on which a computer program is stored, wherein when executed by a processor, the computer program implements the above eye-protection method.

Those of ordinary skill will understand that all or part of the operations to implement the various method embodiments described above may be accomplished by hardware associated with computer programs. The aforementioned computer program may be stored in a computer readable storage medium. Operations of the aforementioned methods are performed when the program is executed; and the aforementioned storage media includes an ROM, an RAM, a magnetic disk, an optical disk, or any of other various media that can store software programs.

Third Embodiment

Figure 3:
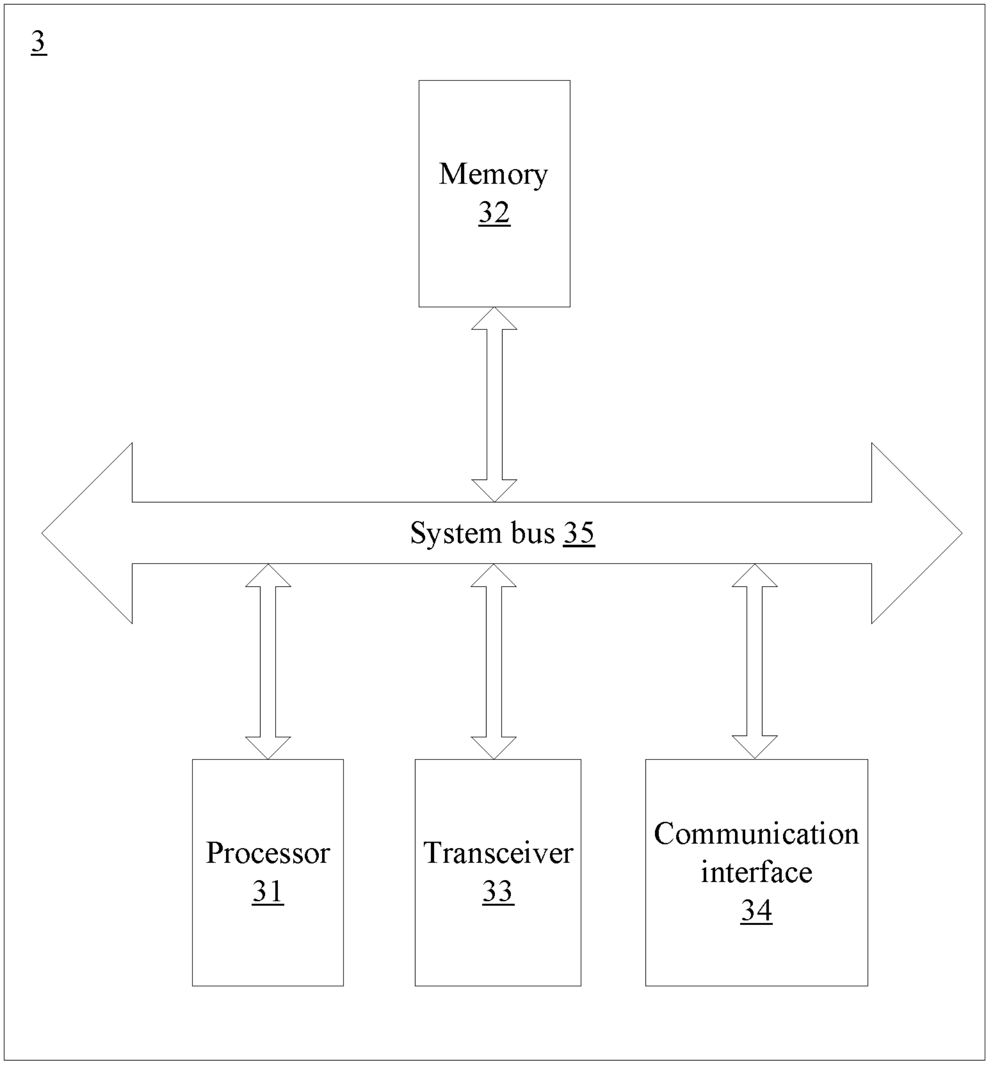
FIG. 3 shows a schematic diagram of a device according to an embodiment of the present disclosure.

Third Embodiment provides a device. FIG. 3 shows a schematic structural diagram of the device according to an embodiment of the present disclosure. The device 3 includes a processor 31, a memory 32, a transceiver 33, a communication interface 34, or/and a system bus 35; the memory 32 and the communication interface 34 are connected with the processor 31 and the transceiver 33 through the system bus 35 to complete mutual communication. The memory 32 stores computer programs, the communication interface 34 communicates with other devices, and the processor 31 and the transceiver 33 run computer programs to enable the device 3 to perform the operations of the eye-protection method as described in Second Embodiment.

The system bus 35 mentioned above may be a Peripheral Component Interconnect (PCI) bus or an Extended Industry Standard Architecture (EISA) bus, etc. The system bus 35 can be divided into address bus, data bus, control bus, etc. For convenience of representation, only a thick line is used in the figure, but it does not mean that there is only one bus or one type of bus. The communication interface is used to implement communication between the database access device and other devices (such as a client, a read-write library, and a read-only library). The memory may include Random Access Memory (RAM), or may also include non-volatile memory, such as at least one disk memory.

The processor may be a general-purpose processor, for example, a central processing unit (CPU for short), a network processor (NP), etc.; it may also be a Digital Signal Processor (DSP), Application Specific Integrated Circuit (ASIC), Field-Programmable Gate Array (FPGA), other programming logic devices, discrete gates or transistor logic devices, or discrete hardware components.

The above-mentioned processor can also be a multi-core heterogeneous processor. A multi-core heterogeneous processor generally includes several Application Processor Units (APU), Neural Network Processor Units (NPU), Graphic Processor Units (GPU), and Secure Processing Units (SPU), etc. Multiple processors with different architectures can be heterogeneously interconnected and organically integrated into a single heterogeneous processor, cooperating and coordinating with each other to fulfill their respective duties to meet the ever-changing application scenarios.

The protection scope of the eye-protection method as described in the present disclosure is not limited to the sequence of operations listed. Any scheme realized by adding or subtracting operations or replacing operations of the traditional techniques according to the principle of the present disclosure is included in the protection scope of the present disclosure.

The present disclosure also provides an eye-protection system, the eye-protection system can implement the eye-protection method described in the present disclosure, but the device for implementing the eye-protection method described in the present disclosure includes, but is not limited to, the eye-protection system as described in the present disclosure. Any structural adjustment or replacement of the prior art made according to the principles of the present disclosure is included in the scope of the present disclosure.

In summary, by taking full advantage of the computing power and sensor data of electronic devices, and using a combination of fusion computing and deep learning, the eye-protection system, method, device, and computer-readable storage medium described in the present disclosure has developed an eye-protection algorithm to enhance the eye-protection features of electronic devices. The present disclosure effectively overcomes various shortcomings and a has high industrial value.

Fourth Embodiment

As our lives become increasingly fast-paced, electronic devices are playing a bigger role in connecting us with others, organizations, and society as a whole. In our daily routines, we often need to transfer paper materials like books and business cards to our electronic devices for display. The most common way to do this is by capturing an image of the paper material and sending it to the device for display. However, due to limitations in image capture technology and screen displays, it can be difficult for electronic devices to achieve a paper-like display. This can lead to eye strain, dryness, pain, and even nearsightedness or astigmatism when viewing paper materials on electronic devices for extended periods of time. A paper-like display means that the image of the paper material displayed on the electronic device looks the same or similar to how the paper material would appear to the human eye in real world. It's worth noting that images with a paper-like display effect are easier on the eyes and therefore can reduce eye strain and damage, providing a good eye-protection effect.

To address these issues, the present disclosure provides a paper-like display method, which uses a deep learning model. The model processes light parameter of a current environment, an image to be displayed, and a reference image, to produce an image with a paper-like display effect. Additionally, the method can adjust a display parameter of the display based on the light parameter of the current environment to provide an eye-protection effect. By adjusting both the image and the display, the present disclosure provides a more comfortable viewing experience with better eye protection. By adjusting the image to be displayed to an image with a paper-like display effect and adjusting the display to have an eye-protection effect, the present disclosure can achieve a good eye-protection effect.

Figure 4:
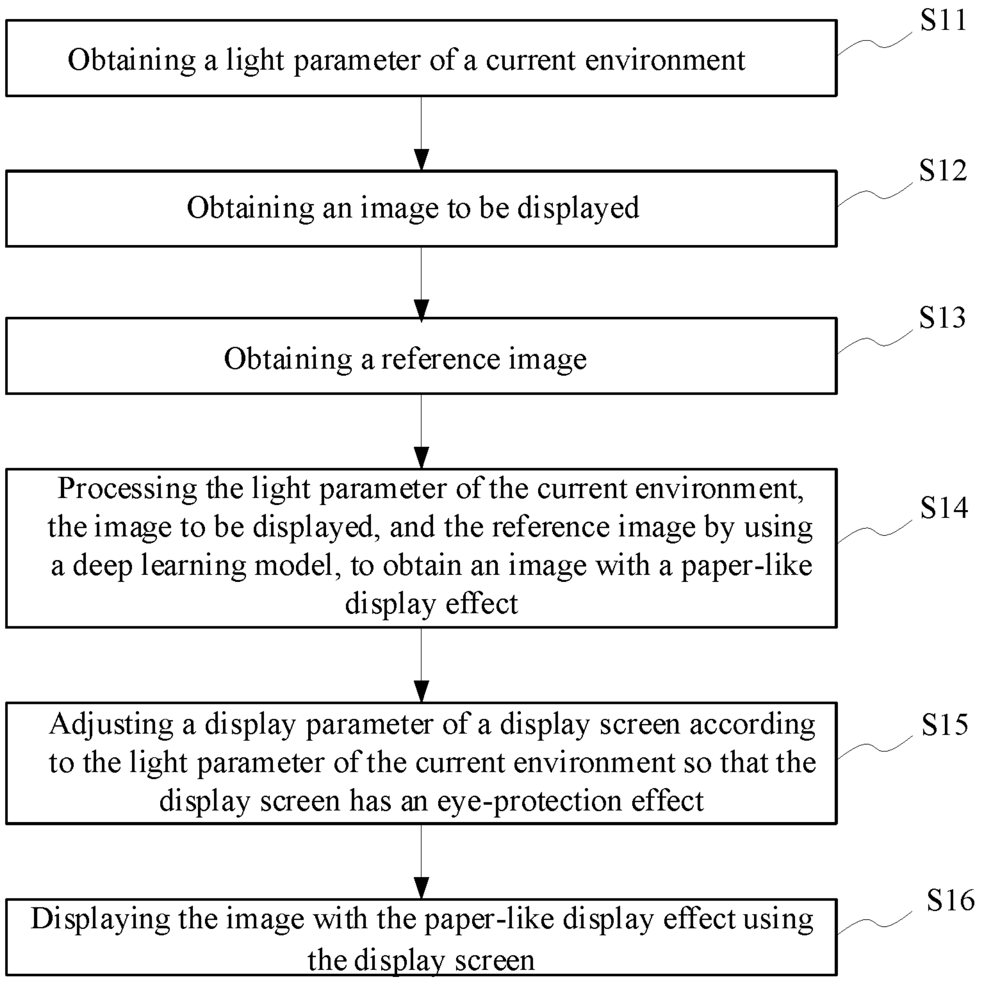
FIG. 4 is a flowchart illustrating a paper-like display method according to an embodiment of the present disclosure.

Referring to FIG. 4, in one embodiment of the present disclosure, the paper-like display method is applied to an electronic device having a display, and includes operations S11 to S16.

S11: obtaining the light parameter of the current environment. The light parameter of the current environment includes parameters that affect human observation such as brightness and color temperature. In practical applications, sensors such as RGB cameras or 3D depth cameras can be used to obtain the light parameter of the current environment.

S12: obtaining the image to be displayed. The image to be displayed can be obtained using the electronic device's own image acquisition module or from other image acquisition devices. For example, when the electronic device is a mobile phone, the image to be displayed can be an image captured by the phone's camera or an image obtained from another device via Bluetooth or WiFi. Specifically, the image to be displayed is an image of paper materials, which include various paper objects such as paper books, notebooks, business cards, etc.

S13: obtaining a reference image having a paper-like display effect in a standard environment; The standard environment is one with a specific color temperature and a specific brightness where paper materials observed by the human eye have characteristics such as low saturation, low contrast, and low brightness. The image of paper materials observed by the human eye in this standard environment is the reference image. Preferably, the standard environment is one with a color temperature of 6500K and a brightness of 1500 lux.

It should be noted that since the image of paper materials observed by the human eye is a subjective concept, it needs to be quantified in practical applications. Therefore, in the present disclosure, an image acquisition device, such as a camera, is used to obtain an image of paper materials in the standard environment as the reference image.

S14: processing the light parameter of the current environment, the image to be displayed, and the reference image by using a deep learning model, to obtain an image with a paper-like display effect. The image with a paper-like display effect is similar to paper materials observed directly by the human eye and has parameters such as saturation and brightness that are comfortable for human vision. Therefore, the image with a paper-like display effect is friendly to users' eyes and helps achieve good eye-protection effects with this paper-like display method.

A deep learning model is an artificial intelligence model that learns the intrinsic patterns and hierarchical representations of sample data. It forms more abstract high-level representations of attribute categories or features by combining low-level features to discover distributed feature representations of data. Therefore, a deep learning model has the ability to capture the intrinsic relationships between data. In the paper-like display method described herein, the deep learning model used has the ability to capture the intrinsic relationships between the light parameter of the current environment, the image to be displayed, the reference image, and the image with a paper-like display effect. Therefore, by properly training the deep learning model, it can process the light parameter of the current environment, the image to be displayed and the reference image, to obtain an image with a paper-like display effect. The deep learning model is a multi-layer weight matrix with many parameters. By applying the multi-layer weight matrix to the model's input (i.e., the light parameter of the current environment, the image to be displayed and the reference image), its output is an image with a paper-like display effect.

In the present disclosure, the training of the deep learning model may be implemented in existing ways or in any other suitable ways.

S15: adjusting a display parameter of a display screen according to the light parameter of the current environment so that the display screen has an eye-protection effect. The display parameter of the display screen is, for example, display contrast, display brightness, display color temperature, etc. In specific applications, one way to adjust the display parameter is to reduce the display brightness when the brightness of the current environment is low, and to enhance the display brightness when the brightness of the current environment is high.

Preferably, operation S15 is performed to adjust the display parameter of the display screen only when the light parameter of the current environment differs significantly from the light parameter in the standard environment.

S16: displaying the image with the paper-like display effect using the display screen.

According to the above description, it can be seen that the paper-like display method of the present disclosure can use the deep learning model to process the light parameter of the current environment, the image to be displayed, and the reference image to obtain a digital image with an eye-protection effect in the standard environment. In addition, when the light parameter of the current environment differs significantly from those of the standard environment, the paper-like display method can adjust the display parameter of the display screen according to the light parameter of the current environment. This allows the display to adjust its display parameter according to lighting conditions of the current environment to provide an eye-protection effect. Based on the above description, it can be seen that the paper-like display method disclosed herein can use a display with an eye-protection effect to display images with a paper-like display effect. This can reduce the damage caused by the display to users' eyes and provide good eye protection.

In an embodiment of the present disclosure, the paper-like display method further includes: normalizing the light parameter of the current environment, the image to be displayed, and/or the reference image. Optionally, methods for normalizing the light parameter of the current environment include filtering out outliers, interpolating and repairing missing values, mapping parameter value fields, and/or adjusting parameter weights; and/or normalizing the image to be displayed and/or the reference image includes performing color format conversion, image rotation, image scaling, and/or image cropping.

Figure 5A:
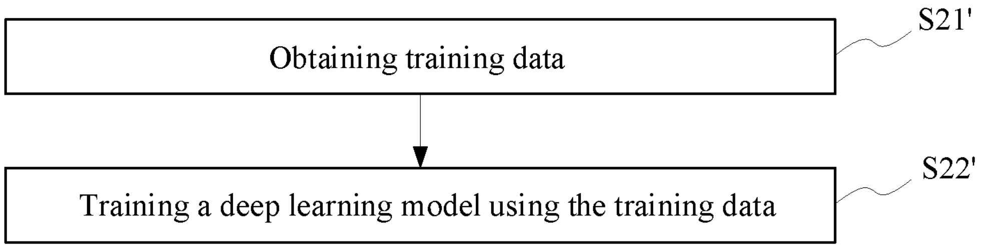
FIG. 5A is a flowchart illustrating training of a deep learning model in a paper-like display method according to an embodiment of the present disclosure.

Referring to FIG. 5A, in an embodiment of the present disclosure, paper-like effect features of the digital images used in the training process of the deep learning model include paper-like pattern features and displaying features, and a training for the deep learning model includes:

S21': obtaining training data; the training data includes a large dataset of paper-like effects of digital images and a large dataset of displaying mapping. The large dataset of paper-like effects of digital images includes a plurality of images of paper materials acquired using an image acquisition device in the standard environment; the large dataset of displaying mapping includes a mapping relationship between color pixel values displayed on the display screen and color pixel values acquired by the image acquisition device. In specific applications, construction of the large dataset of paper-like effects of digital images may be achieved by capturing a plurality of images of paper materials using an image acquisition device in a standard environment.

Figure 5B:
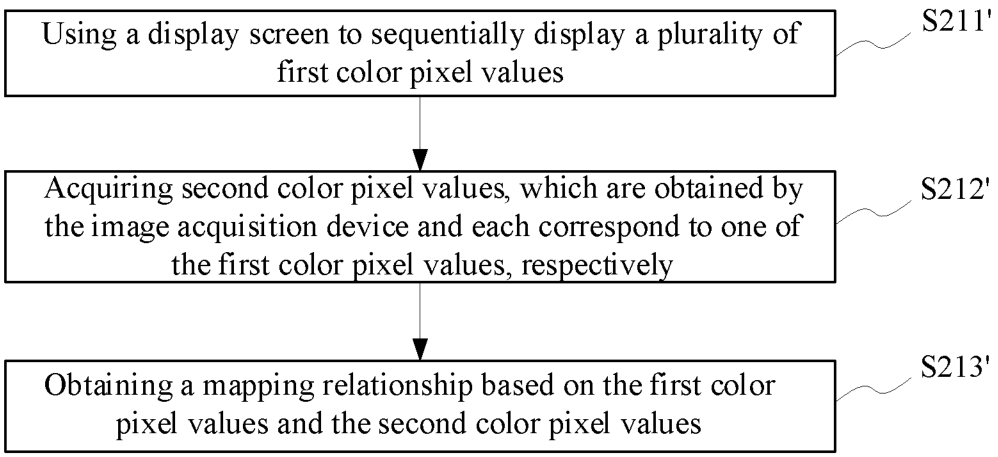
FIG. 5B is a flowchart illustrating operation S21 of a paper-like display method according to an embodiment of the present disclosure.

Referring to FIG. 5B, in one embodiment, a method for acquiring the mapping relationship includes:

S211': using the display screen to sequentially display a plurality of first color pixel values; preferably, the display displays all available color pixel values (that is, a total of 256×256×256 different values in the RGB mode) in sequence as the first color pixel values.

S212': acquiring second color pixel values, which are obtained by the image acquisition device and each correspond to one of the first color pixel values, respectively. Specifically, when any of the first color pixel values is displayed on the display screen, the image acquisition device is used to capture the display and obtain the color pixel value of the captured images as a second color pixel value in a mapping relationship with this first color pixel value.

S213': obtaining the mapping relationship based on the first color pixel values and the second color pixel values.

It is noted that the process of quantitatively evaluating the eye-like effect and displaying effect observed by the human eye is a process of digitally representing analog signals. The image acquisition device used for digital representation in the present disclosure may be one or more of a scanner, a camera, a cell phone, etc.; for example, a camera may be used as the image acquisition device and the camera used in both acquisition processes is the same camera.

S22': training the deep learning model using the training data; wherein the process can be implemented using existing methods.

Preferably, after acquiring the training data, the training for the deep learning model further includes: normalizing the training data, and/or calibrating feature points on images in the training data. Methods for normalizing the training data includes filtering out outliers, interpolating and repairing missing values, and/or mapping parameter value fields.

In an embodiment of the present disclosure, the deep learning model includes a paper-like image sub-model and a screen displaying sub-model, wherein the paper-like image sub-model maps the image to be displayed to an image with a first paper-like effect, and the screen displaying sub-model maps the image with the first paper-like effect to the image with the paper-like display effect, wherein the first paper-like effect refers to a paper-like effect as observed by the human eye.

Specifically, the paper-like image sub-model maps the image to be displayed to the image with the first paper-like effect; the paper-like image sub-model includes a digital image input layer including a convolutional layer, and an encoding network for eye-protection effects of digital images. The paper-like pattern features include, but are not limited to, RGB color space histogram, hue, saturation, correlation, paper texture features, etc. A process of calibrating the paper-like pattern features in one embodiment is as follows: operation 1, images of paper materials in the standard environment are captured by the image acquisition device; operation 2, all color pixel values appearing on the captured images of paper materials and their corresponding raw pixel values of the digital images input to the display are recorded and analyzed, thereby constituting a large data set of paper-like effects of digital images; operation 3, features such as RGB color space histogram, hue, saturation, correlation of different colors from the large dataset of paper-like effects for digital images are recorded and analyzed, to form input-output data for the paper-like image sub-model. Optionally, the process of calibrating the paper-like pattern features further includes: capturing the paper texture features for subsequent optimization of the eye-protection effect.

The screen displaying sub-model maps the image with the first paper-like effect to the image with the paper-like display effect, and includes a change network for eye-protection effects of digital images, a decoding network for eye-protection effects of digital images, and an output layer for eye-protection effects of digital images. During training of the screen displaying sub-model, the displaying features used may be extracted from the large dataset of displaying mappings, and include display brightness, display saturation, etc. In one embodiment, the basic structure of the encoding network and decoding network may include a convolutional layer, a residual network, a MobileNet and/or a fully connected layer.

Figure 6:
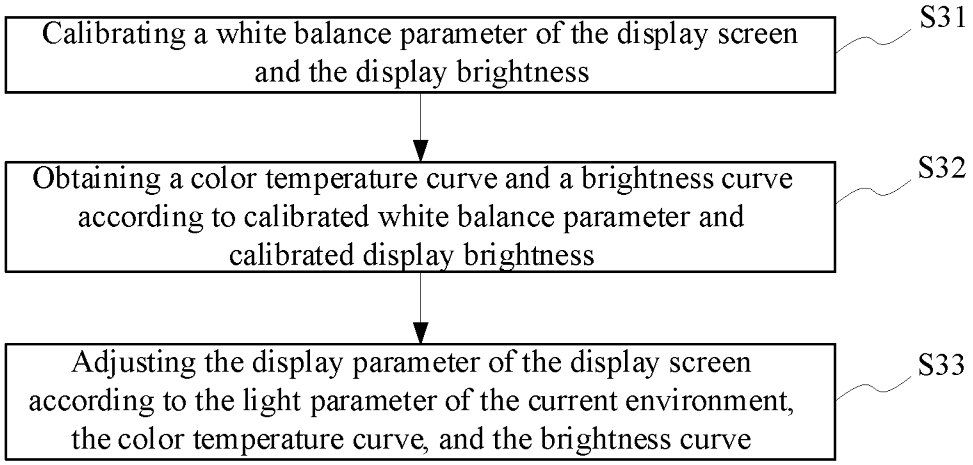
FIG. 6 is a flowchart illustrating adjustment of display a parameter of a display screen in a paper-like display method according to an embodiment of the present disclosure.

In one embodiment, the light parameter of the current environment includes brightness and/or color temperature of the current environment; the display parameter of the display screen includes display brightness and/or display color temperature. Considering that the human eye does not have the same subjective perception of brightness, white balance, color, saturation and contrast under different color temperature and different lighting conditions, the display parameter of the display screen needs to be adjusted when the light parameter of the current environment is different from those of the standard environment. To achieve this purpose, referring to FIG. 6, adjusting the display parameter of the display screen according to the light parameter of the current environment in one embodiment includes:

S31: calibrating a white balance parameter of the display screen and the display brightness. Specifically, the white balance of the display is calibrated under the same brightness and different color temperatures; the display brightness is calibrated under specific color temperatures and different brightness; in specific applications, one or more color temperature values can be selected as the specific color temperatures according to the actual demand. In one embodiment, calibration of the color temperature may be performed using algorithms such as the Gray World algorithm, White Patch algorithm, etc.

S32: obtaining a color temperature curve and a brightness curve according to calibrated white balance parameter and calibrated display brightness. Specifically, through the calibration of operation S31, multiple discrete data points can be obtained. According to these data points, the color temperature curve and the brightness curve can be obtained. Techniques for obtaining the color temperature curve and the brightness curve include but are not limited to bilinear interpolation, nearest neighbor interpolation, spline curve fitting, etc.

S33: adjusting the display parameter of the display screen according to the light parameter of the current environment, the color temperature curve, and the brightness curve. The operation S33, by adjusting the display parameter of the display screen, can make the display effect of the display in the current environment consistent with real paper materials, at which time, the display can be considered to have an eye-protection effect.

Figure 7A:
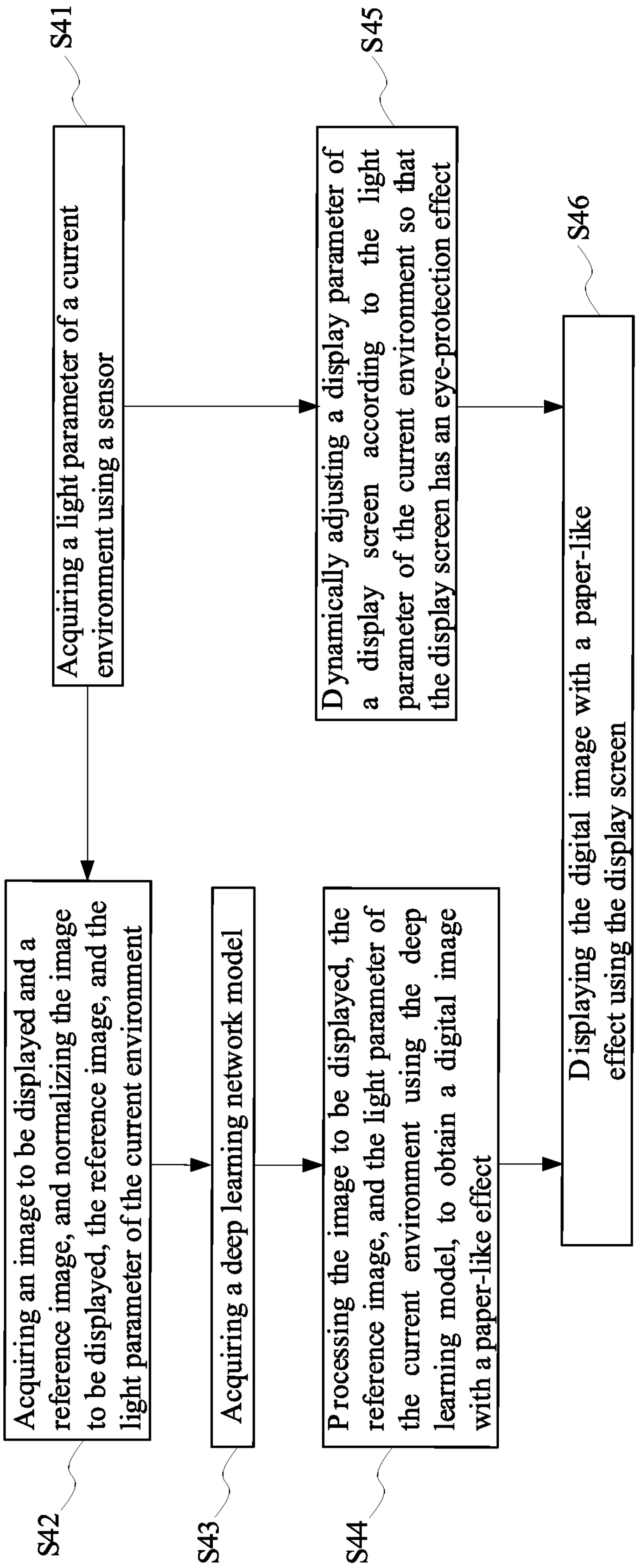
FIG. 7A is a flowchart illustrating a paper-like display method according to an embodiment of the present disclosure.

Referring to FIG. 7A, in an embodiment of the present disclosure, the paper-like display method includes S41 to S46.

S41: acquiring a light parameter of a current environment using a sensor, wherein the sensor is, for example, an RGB camera or a 3D depth camera, and the light parameter of the current environment is, for example, brightness and contrast of the current environment.

S42: acquiring an image to be displayed and a reference image, and normalizing the image to be displayed, the reference image, and the light parameter of the current environment.

S43: acquiring a deep learning network model, wherein the deep learning network model includes a digital image input layer including a convolutional layer, an encoding network for paper-like effects of digital images, a change network for paper-like effects of digital images, a decoding network for paper-like effects of digital images, and an output layer for paper-like effects of digital images.

Figure 7B:
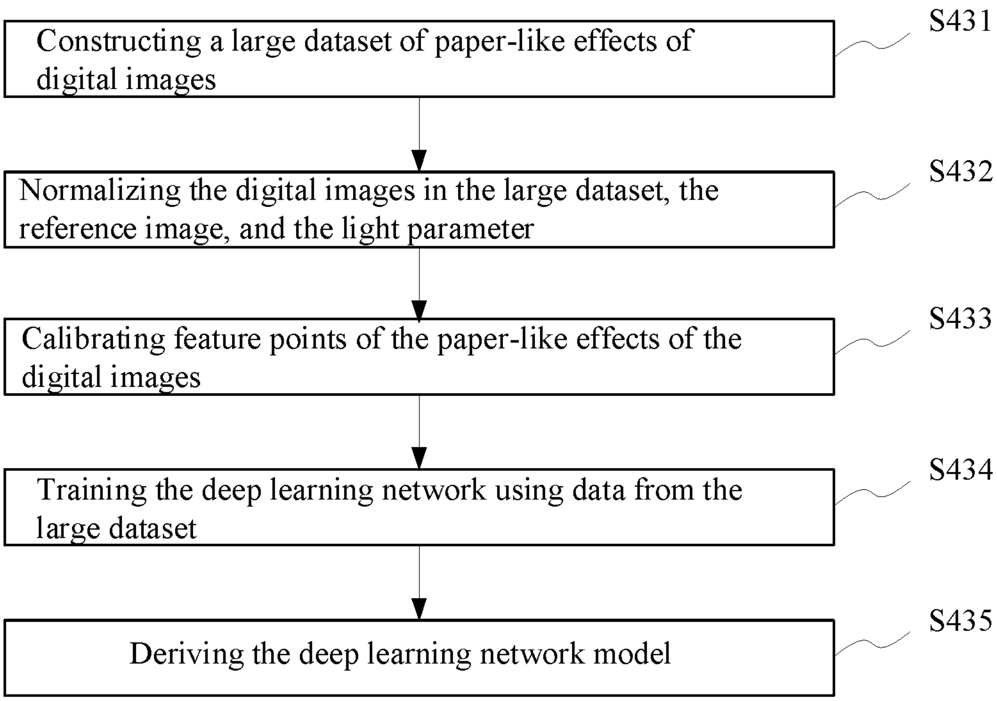
FIG. 7B is a flowchart illustrating training a deep learning model in a paper-like display method according to an embodiment of the present disclosure.

Referring to FIG. 7B, in one embodiment, a method for acquiring the deep learning network model includes S431 to S435.

S431: constructing a large dataset of paper-like effects of digital images.

S432: normalizing the digital images in the large dataset, the reference image, and the light parameter.

S433: calibrating feature points of the paper-like effects of the digital images.

S434: training the deep learning network using data from the large dataset.

S435: deriving the deep learning network model.

S44: processing the image to be displayed, the reference image, and the light parameter of the current environment using the deep learning model, to obtain a digital image with a paper-like effect.

S45: dynamically adjusting a display parameter of a display screen according to the light parameter of the current environment so that the display screen has an eye-protection effect. It is noteworthy that operation S45 may be executed after the execution of operations S42 to S44 is completed, or may be executed simultaneously with operations S42 to S44, or may be executed before operations S42 to S44.

S46: displaying the digital image with a paper-like effect using the display screen.

Figure 8:
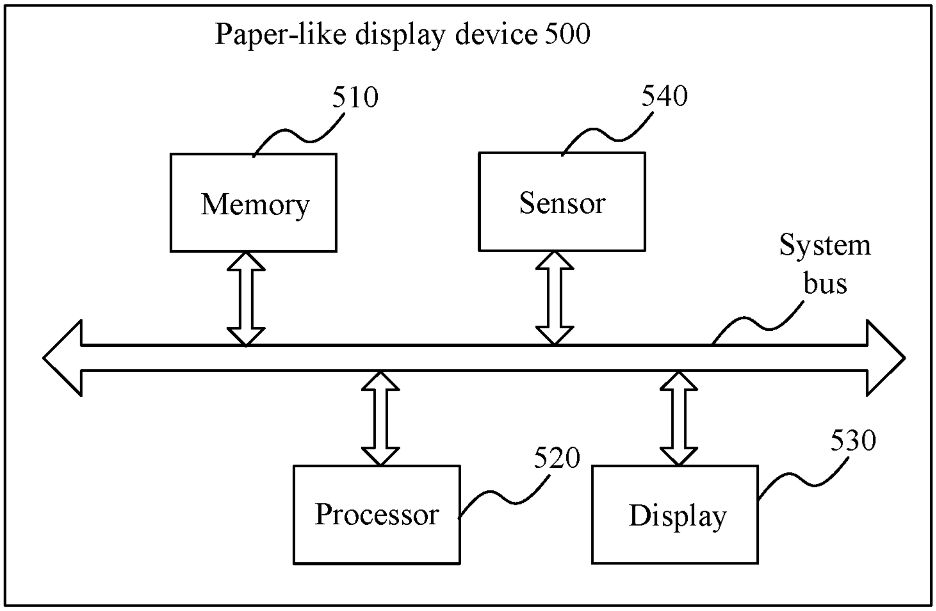
FIG. 8 shows a schematic structural diagram a paper-like display device according to an embodiment of the present disclosure.

Based on the above description of the paper-like display method, the present disclosure further provides a non-transitory computer-readable storage medium having a computer program stored thereon, wherein when executed by a processor, the computer program implements the paper-like display method described in the present disclosure Based on the above description of the paper-like display method, the present disclosure also provides an electronic device. Referring to FIG. 8, in an embodiment of the present disclosure, the paper-like display device 500 includes a memory 510, a processor 520, a display 530, and a sensor 540. The memory 510 stores a computer program; the processor 520 is communicatively coupled to the memory 510, and for executing the computer program to implement the paper-like display method described in the present disclosure; the display 530 is communicatively coupled to the memory 510 and the processor 520 for displaying an interactive graphics user interface associated with the paper-like display method; the sensor 540, communicatively coupled to the processor 520, is used to obtain the light parameter of the current environment. The sensor 540 is, for example, a 3D depth camera or an RGB camera.

The processor 520 described above can be a general-purpose processor or a heterogeneous multi-core processor. A heterogeneous multi-core processor integrates multiple computing cores of different architectures in a single processor chip, thereby improving the integrated computing performance of the chip. These computing cores have rich communication methods between them that allow for fast data transfer and sharing. They are heterogeneously integrated and have a combined effect greater than the mere sum of their parts. Heterogeneous multi-core processors typically can integrate Application Processor Units (APUs), Neural Network Processor Units (NPUs), Graphic Processor Units (GPUs), and Secure Processing Units (SPUs), etc. They can meet the computing power requirements for multimedia, scientific computing, virtualization, graphics display, and artificial intelligence.

The scope of the eye-protection method as described in the present disclosure is not limited to the sequence of operations listed. Any scheme realized by adding or subtracting operations or replacing operations of the traditional techniques according to the principle of the present disclosure is included in the scope of the present disclosure.

The present disclosure also provides a paper-like display system, the paper-like display system can implement the paper-like display method described in the present disclosure, but the device for implementing the paper-like display method described in the present disclosure includes, but is not limited to, the paper-like display system as described in the present disclosure. Any structural adjustment or replacement of the prior art made according to the principles of the present disclosure is included in the scope of the present disclosure.

In light of the concern that displays of electronic products may cause physical damage to human eyes, the present disclosure introduces an artificial intelligence-based paper-like display method to achieve the purpose of eye-protection. Specifically, the paper-like display method described in the present disclosure can process a light parameter of a current environment, an image to be displayed, and a reference image using a deep learning model to obtain an image with a paper-like display effect; furthermore, the paper-like display method can adjust a display parameter of the display screen according to the light parameter of the current environment so that the display screen has an eye-protection effect. By adjusting the image to be displayed to an image with the paper-like display effect and adjusting the display screen to have an eye-protection effect, the present disclosure can achieve a good eye-protection effect.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An eye-protection system, comprising:

a composite sensing data collector for collecting composite sensing data in an environment;

a display for displaying image data in a multimedia content;

a processor for acquiring and normalizing the composite sensing data in the environment and the image data in the multimedia content, performing a fusion calculation on normalized image data in the multimedia content by normalized composite sensing data in the environment to obtain an image eye-protection guiding parameter, and adjusting the image data in the multimedia content based on the image eye-protection guiding parameter to allow the multimedia content to form a multimedia image having an eye-protection effect, wherein the image eye-protection guiding parameter has a mapping relationship with the normalized composite sensing data in the environment and the normalized image data in the multimedia content.

2. The eye-protection system according to claim 1, wherein the composite sensing data collector comprises an RGB sensor, a depth sensor, a light sensor, a distance sensor, or an infrared sensor.

3. The eye-protection system according to claim 1, wherein after the multimedia image having the eye-protection effect is formed, the processor tunes the display based on the composite sensing data in the environment collected by the composite sensing data collector so that the display displays the multimedia content having the eye-protection effect.

4. The eye-protection system according to claim 1, wherein the processor normalizes the composite sensing data in the environment through filtering out outliers, interpolating and repairing missing values, mapping parameter value fields, or adjusting parameter weights;

the processor normalizes the image data in the multimedia content through performing color format conversion, image rotation, image scaling, or image cropping on the image data in the multimedia content.

5. The eye-protection system according to claim 1, wherein the processor has a learning engine for image data provided therein, wherein the processor, when performing the fusion calculation on the normalized image data in the multimedia content by the normalized composite sensing data in the environment, invokes the learning engine for image data to load an eye-protection model file, and establishes a mapping relationship between the eye-protection model file on one side and the normalized composite sensing data in the environment and the normalized image data in the multimedia content on the other side according to the eye-protection model file, in order to infer the image eye-protection guiding parameter, wherein the eye-protection model file is a data file obtained by training a convolutional neural network with a generic eye-protection dataset.

6. An eye-protection method, comprising:

acquiring and normalizing, by a processor, composite sensing data in an environment and image data in a multimedia content;

performing, by the processor, a fusion calculation on normalized image data in the multimedia content by normalized composite sensing data in the environment to obtain an image eye-protection guiding parameter, wherein the image eye-protection guiding parameter has a mapping relationship with the normalized composite sensing data in the environment and the normalized image data in the multimedia content; and adjusting, by the processor, the image data in the multimedia content based on the image eye-protection guiding parameter to allow the multimedia content to form a multimedia image having an eye-protection effect.

7. The eye-protection method according to claim 6, wherein normalizing the composite sensing data in the environment comprises:

filtering out, by the processor, outliers, interpolating and repairing missing values, mapping parameter value fields, or adjusting parameter weights for the composite sensing data in the environment;

normalizing the image data in the multimedia content comprises:

performing, by the processor, color format conversion, image rotation, image scaling, or image cropping on the image data in the multimedia content.

8. The eye-protection method according to claim 6, wherein performing a fusion calculation on normalized image data in the multimedia content by normalized composite sensing data in the environment to obtain an image eye-protection guiding parameter comprises:

invoking a learning engine, where the image data are pre-stored, to load an eye-protection model file, and establishing a mapping relationship between the eye-protection model file on one side and the normalized composite sensing data in the environment and the normalized image data in the multimedia content on the other side according to the eye-protection model file, in order to infer the image eye-protection guiding parameter, wherein the eye-protection model file is a data file obtained by training a convolutional neural network with a generic eye-protection dataset.

* * * * *